ately extend therefrom, and a position limiting member formed of an elastically deformable material and secured on a rear surface of the lock plate so as to extend therefrom. The position limiting member has an extended end which abuts against a projection formed to one of the pivot pins rotatably supporting the front lid at both side ends to limit an outward locking position of the lock plate. The locking claw and the projection of the lock plate extend outwardly through holes formed in the front wall of the front lid in a manner that the front lid is closed in the abutting engagement of the locking claw with an inner surface of one of side ends of the front lid, that the projection is inwardly pressed to retract the lock plate to a lock releasing position against an urging force of the position limiting member, and that the pivot pins of the front lid are pivoted to release that engagement to return the position limiting member when the front lid is opened.

United States Patent [19]

Nagai et al.

[11] Patent Number: 5,011,096

[45] Date of Patent: Apr. 30, 1991

[54] TAPE CASSETTE

[75] Inventors: Harushige Nagai, Ishioka; Masato Kiryu, Mito; Takeshi Sasaki; Akira Saotome, both of Ibaraki, all of Japan

[73] Assignee: Victor Company of Japan, Ltd., Yokohama, Japan

[21] Appl. No.: 337,818

[22] Filed: Apr. 14, 1989

[30] Foreign Application Priority Data

Apr. 20, 1988 [JP] Japan .............................. 63-53337[U]

[51] Int. Cl.$^5$ .................................... G11B 23/087
[52] U.S. Cl. .................................... 242/199; 360/132; 242/198
[58] Field of Search ................. 360/132; 242/197, 198, 242/199, 200

[56] References Cited

U.S. PATENT DOCUMENTS

| 4,608,616 | 8/1986 | Wakui et al. | 242/199 X |
| 4,697,702 | 10/1987 | Urayama | 242/199 X |
| 4,712,150 | 12/1987 | Pertzsch et al. | 360/132 |
| 4,884,158 | 11/1989 | Pertych et al. | 242/198 X |
| 4,930,821 | 6/1990 | Jang | 242/200 X |

Primary Examiner—Daniel P. Stodola
Assistant Examiner—Paul Thomas Bowen
Attorney, Agent, or Firm—Fleit, Jacobson, Cohn, Price, Holman & Stern

[57] ABSTRACT

A tape cassette generally comprises a case body composed of upper and lower case halves, a front lid mounted to the case body, a mechanism mounted in the case body for locking the front lid, and a chamber in which the locking mechanism is mounted. The locking mechanism includes a lock plate which is mounted in the chamber so as to be swingable. The lock plate is provided with a locking claw, a projection on the front surface thereof so as to outwardly extend therefrom, and a position limiting member formed of an elastically deformable material and secured on a rear surface of the lock plate so as to extend therefrom. The position limiting member has an extended end which abuts against a projection formed to one of the pivot pins rotatably supporting the front lid at both side ends to limit an outward locking position of the lock plate. The locking claw and the projection of the lock plate extend outwardly through holes formed in the front wall of the front lid in a manner that the front lid is closed in the abutting engagement of the locking claw with an inner surface of one of side ends of the front lid, that the projection is inwardly pressed to retract the lock plate to a lock releasing position against an urging force of the position limiting member, and that the pivot pins of the front lid are pivoted to release that engagement to return the position limiting member when the front lid is opened.

2 Claims, 6 Drawing Sheets

TAPE CASSETTE

BACKGROUND OF THE INVENTION

The present invention relates to a tape cassette and more particularly to a tape cassette provided with a locking mechanism for locking a front lid disposed to close the front portion of a cassette case body and adapted to protect the tape mounted in the cassette case.

Generally, a tape cassette, for example, a tape cassette adapted to be mounted in a video cassette deck is provided with a front lid disposed to the front portion of a cassette case body to protect a magnetic tape, called merely "a tape" hereinafter, which is guided outside the front portion of the case body. The front lid is secured to the front portion of the case body to be pivotable to open or close the front lid in such a manner that, when the cassette is not used, the front lid is locked so as to cover the outside of the tape and that, when the cassette is mounted in the video deck, the locking mechanism is released. Thus the front lid is pivoted upwardly to open the same, and the tape is drawn out from the front portion of the case body towards a rotating head.

A general tape cassette for a video cassette deck of the described type is shown in FIGS. 5 and 6. Referring to FIGS. 5 and 6, a main case body 2 of a tape cassette 1 is substantially composed of upper and lower case halves 2a and 2b which are mated with each other and secured to each other by means of screws. The case body 2 is generally made of a plastic material. A pair of tape reels 4 and 4 around which a tape 3 is reeled, are housed in the case body 2 to be rotatable in substantially a bilaterally symmetrical arrangement. The tape 3 unwound from one of the reels 4 is exposed through the front portion of the case body 2 and then taken up by the other reel.

Transparent leader tapes are connected to both ends of the tape 3. A through hole 5 is formed at the front central portion of the case half 2b. When the tape cassette 1 is mounted in the video deck, a light detecting lamp 6 for detecting light is guided into the through hole 5 and the detected light from the light detecting lamp 6 is transmitted to a photosensor through the transparent leader tape thereby detecting the end of the tape 3.

A front lid 7 located at the front portion of the case body 2 to protect the tape 3 is provided with bilateral side ends 7a and 7a, which are secured to the front portions of the bilateral side walls of the case body 2 to be pivotable about pins 7b and 7b. The front lid 7 is urged to be closed by means of a coil spring 8 mounted on the pin 7b and is locked by means of a lid closing mechanism.

A member 9 for operating the front lid locking mechanism of the tape cassette 1 is secured to a portion on the side of the cassette deck, and when the tape cassette 1 has been mounted in the cassette deck, the locking mechanism is released by means of the member 9. A lever 10 provided for the cassette deck and adapted to operate as a front lid releasing member is guided into a vertical groove 11 formed in the front portion of the case body 2 thereby upwardly opening the front lid against the urging force of the coil spring 8.

The front lid locking mechanism described above will be explained in further detail hereunder, with reference to FIG. 7.

Referring to FIG. 7, the lower case half 2b constituting part of the case body 2 is provided with a chamber 12 for mounting a lock plate 13. The lock plate 13 is provided with a locking claw 13a and a projection 13b for releasing the locking of the front lid 7. The lock plate 13 is supported by walls of the lock plate mounting chamber 12 so as to be pivotable about pivot portions 13c and 13c in the shape of pins formed integrally with the lock plate 13 at the upper portion thereof, the pivot portions 13c being merely called pins 13c hereinafter. The lock plate 13 is urged by an additionally disposed return spring 14 to a locking position on a front wall side of the chamber 12 so as to project the locking claw 13a outwardly through a hole formed in the front wall 12a of the chamber 12. The projected end of the locking claw 13a is engaged with the inner surface of one side end 7a of the front lid 7 thereby locking the same.

The front lid locking mechanism is released by inwardly pressing the projection 13b which projects outwardly of the case body 2 through a notch formed in the front wall 12a of the lock plate mounting chamber 12.

With the front lid locking mechanism of the type described, however, the mounting of the return spring 14 involves troublesome work and the tape cassette itself includes many parts or members that have to be assembled.

In order to obviate the problems described above with reference to FIG. 7, there is provided another lid locking mechanism for a tape cassette as disclosed in Japanese Utility Model Publication No. 60-20210, which will be described hereunder with reference to FIG. 8, in which a spring member is preliminarily formed integrally with the lock plate.

Referring to FIG. 8, showing a perspective view of a front lid locking mechanism in a disassembled state, a lock plate 15 is provided with a locking claw 15a and a projection 15b which are similar to those 13a and 13b of the lock plate 13 of FIG. 7. A thin plate-like spring member 15e of substantially U-shape is integrally formed with the lock plate 15 at the lower portion of an inner surface of the lock plate 15 in a cantilevered manner so as to extend upwardly as shown in FIG. 8. The lock plate 15 is inserted into a lock plate mounting chamber 12 similar to that of FIG. 7 from the upper side thereof along the front wall 12a of the chamber 12 until pivot pins 15c integrally formed at the upper bilateral end portions of the lock plate 15 come into engagement with grooves 12b formed in the upper portions of the side walls of the mounting chamber 12.

As described, when the lock plate 15 is inserted into the mounting chamber 12, the plate spring member 15e abuts against the inner surface of a rear wall 12c of the chamber 12 while elastically deformed. The lock plate 15 is lowered under the state in which the extending free end $15e_1$ of the plate spring member 15e, always abuts elastically against the inner surface of the rear wall 12c of the mounting chamber 12. According to the provision of the plate spring member 15e, the lock plate 15 is urged forward to the locking position thereof on the side of the front wall 12a. Under this condition, the locking claw 15a projects outwardly through a hole formed in the front wall 12a of the mounting chamber 12 so as to come into engagement with the inner surface of the one side end 7a of the front lid 7 to lock the same. The locking mechanism of FIG. 8 can also be released by inwardly pressing the projection 15b as described with reference to the mechanism shown in FIG. 7.

However, with the lid locking mechanism for a tape cassette of FIG. 8, the plate like spring member 15e always abuts elastically against the inner surface of the rear wall 12c of the lock plate mounting chamber 12, so that the plate spring member 15e may be adversely deformed or may have its elastic properties changed with the lapse of time. In an adverse case, the front lid 7 cannot be securely locked and closed, whereby the tape 3 accommodated in the cassette 1 cannot be sufficiently protected.

SUMMARY OF THE INVENTION

An object of the present invention is to substantially eliminate the defects or drawbacks inherent to the conventional technique described above, and to provide a tape cassette including an improved mechanism for locking a front lid thereof having a simple structure to be easily mounted in the cassette body.

Another object of the present invention is to provide a mechanism for locking a front lid of a tape cassette comprising a lock plate, the swingable movement of which is limited by a position limiting member having an elastic structure suited to long-term use.

These and other objects can be achieved according to the present invention by providing a tape cassette in which a pair of tape reels are mounted, the tape cassette comprising a cassette case body composed of a pair of case halves constituting upper and lower case halves when assembled and mounted in the tape cassette to provide front, rear and both side walls of the case body, a front lid, constituting said front wall of the case body, mounted to the case body so as to be pivotable about pivot pins attached to both side ends of the front lid at front portions of the side walls of the case body to open or close a front portion of the case body, a mechanism located in the case body at a portion near the front lid for locking the front lid, the locking mechanism including a lock plate having a front surface facing the front portion of the case body, and a chamber means defined in the lower case half of the case body and provided with a front wall defining the chamber, the lock plate being accommodated in the chamber so as to be swingable, wherein the lock plate is provided with a locking claw, a projection on the front surface thereof so as to outwardly extend therefrom, and a position limiting member formed of an elastically deformable material and secured on a rear surface of the lock plate so as to extend therefrom, the position limiting member having an extended end which abuts against a projection formed to one of the pivot pins to limit an outward locking position of the lock plate, the front wall of the chamber means is provided with through holes through which the locking claw and the projection of the lock plate extend outwardly in a manner so that the front lid is closed in the abutting engagement of the locking claw with an inner surface of one of side ends of the front lid, that the projection is inwardly pressed to retract the lock plate to a lock releasing position against an urging force of the position limiting member, and that the pivot pins of the front lid are pivoted to release that engagement to return the position limiting member when the front lid is opened.

According to the construction of the tape cassette of the present invention described above, the position limiting member is integrally formed with the lock plate to extend therefrom, so that the lock plate can be easily mounted in the lock plate mounting chamber in the case body, whereby the structure of the front lid locking mechanism can be simplified to reduce the number of parts or members to be mounted.

Moreover, the elastically deformable position limiting member of the lock plate is urged by an operating member located on the side of a video deck only at a time when the projection for releasing the locking condition is inwardly pressed and the front lid is under the closed state. Accordingly, the deformation or loss of elastic property of the position limiting member due to the lapse of time can be kept to the minimum. The front lid of the tape cassette can therefore be surely closed and the tape itself can be stably protected.

The preferred embodiment described will be explained in further detail hereunder with reference to the accompanying drawings.

Prior Art

Figure 7:
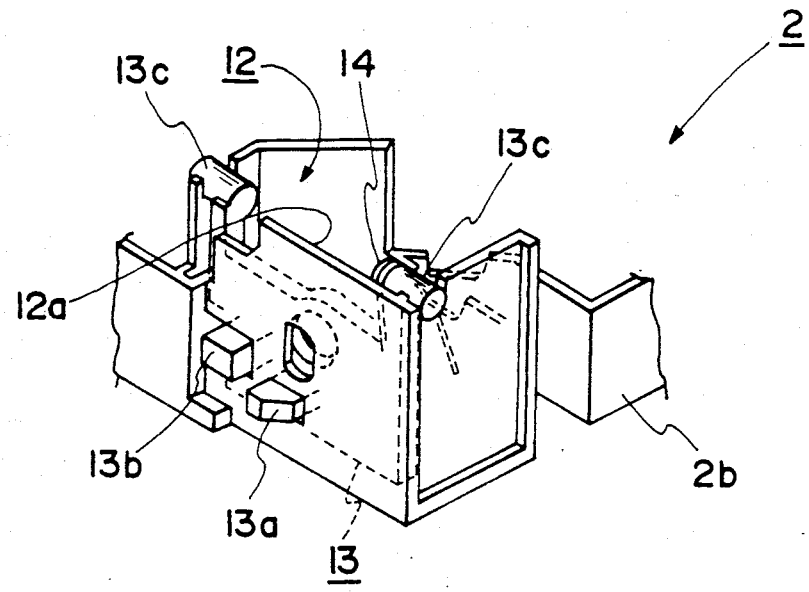
Figure 8:
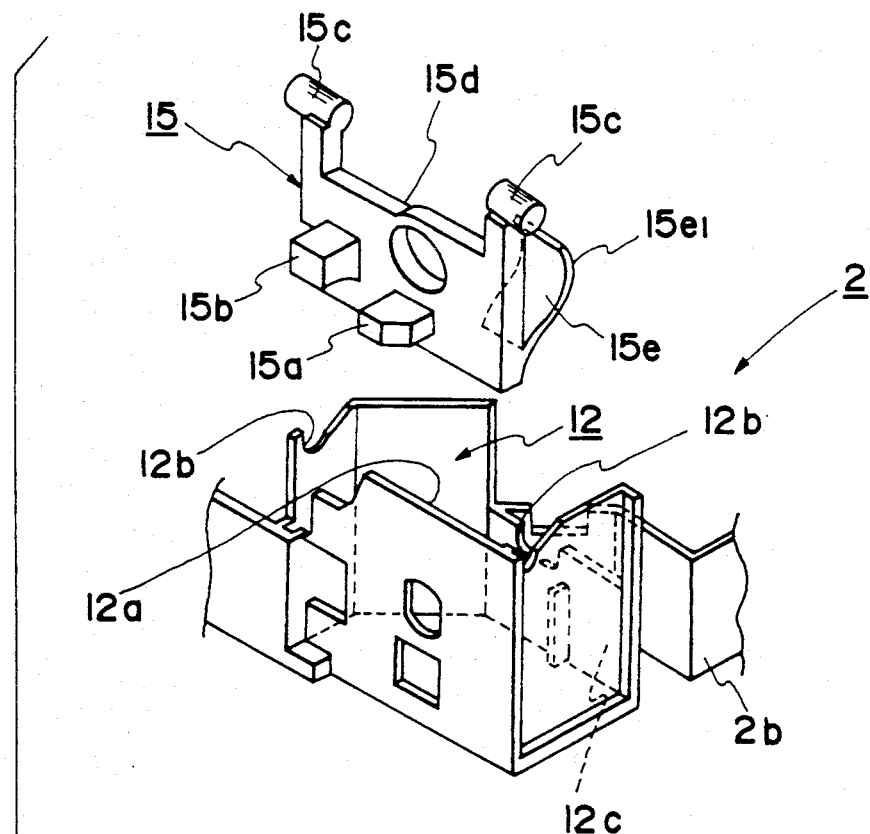

FIG. 7 is a perspective view of a conventional front lid locking mechanism for the tape cassette; and FIG. 8 is also a perspective view of another conventional front lid locking mechanism.

DESCRIPTION OF THE PREFERRED EMBODIMENTS

A locking mechanism for a front lid of tape cassette to be mounted in a cassette deck, for example, according to the present invention will be described hereunder with reference to FIGS. 1 to 4, in which like reference numerals are added to parts or members corresponding to those shown in FIGS. 7 and 8 as described hereinbefore, and for which the detailed descriptions will now be eliminated.

Figure 1:
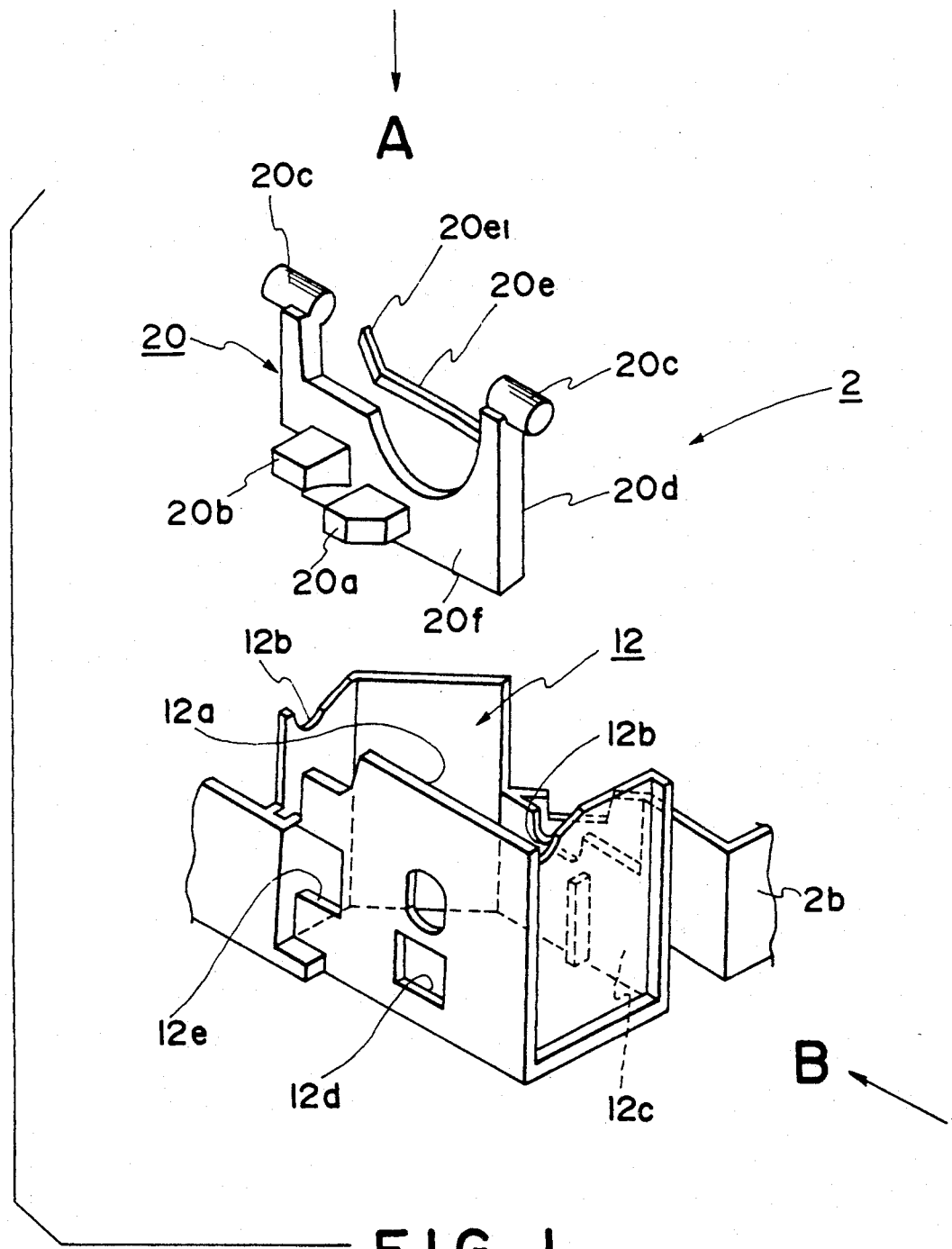
FIG. 1 is a perspective view of a front lid locking mechanism of a tape cassette according to the present invention.

Referring to FIG. 1, a front lid locking mechanism includes a lock plate 20 made of a resin material such as acetal resin with relatively large thickness. The lock plate 20 is provided with bilateral end portions having upward extensions in a state shown in FIG. 1.

A thin, elastically deformable member 20e having one end secured to the inner surface 20d of the extension of one of the bilateral end portions of the lock plate 20 extends in a cantilevered manner so as to bend away from the axial direction of pivot pins 20c formed at the extreme upper ends of the bilateral extensions of the lock plate 20. The lock plate 20 is therefore swingable about the pivot pins 20c in the X-Xa direction (FIG. 2) in the lock plate mounting chamber 12.

The member 20e has an extending free end $20e_1$ and limits the lock plate 20 to the outward locking position of the case body 2 by the abutment of the extending end $20e_1$ of the member 20e against a cylindrical projection 7c suspended from the pivot pin 7b of the front lid 7 of the tape cassette 1, thus the member 20e being referred to as a position limiting member 20e. The lock plate 20 is provided with a locking claw 20a and a projection 20b, which are substantially identical with those shown in FIG. 7 or 8, on the outer surface of the lock plate 20. The locking claw 20a and the projection 20b project, in the assembled state, outwardly through a hole 12d and a notch 12e formed in the front wall 12a of a lock plate mounting chamber 12 defined in the lower case half 2b of the cassette body 2. The front lid 7 is locked in the closed state by the engagement of the locking claw 20a with the inner surface of one end side 7a of the front lid 7.

The operation of the lid locking mechanism having the construction described above according to the present invention will be described hereunder with reference to FIGS. 2 to 4.

A process for mounting the tape cassette 1 in the video deck is first described.

Figure 2A:
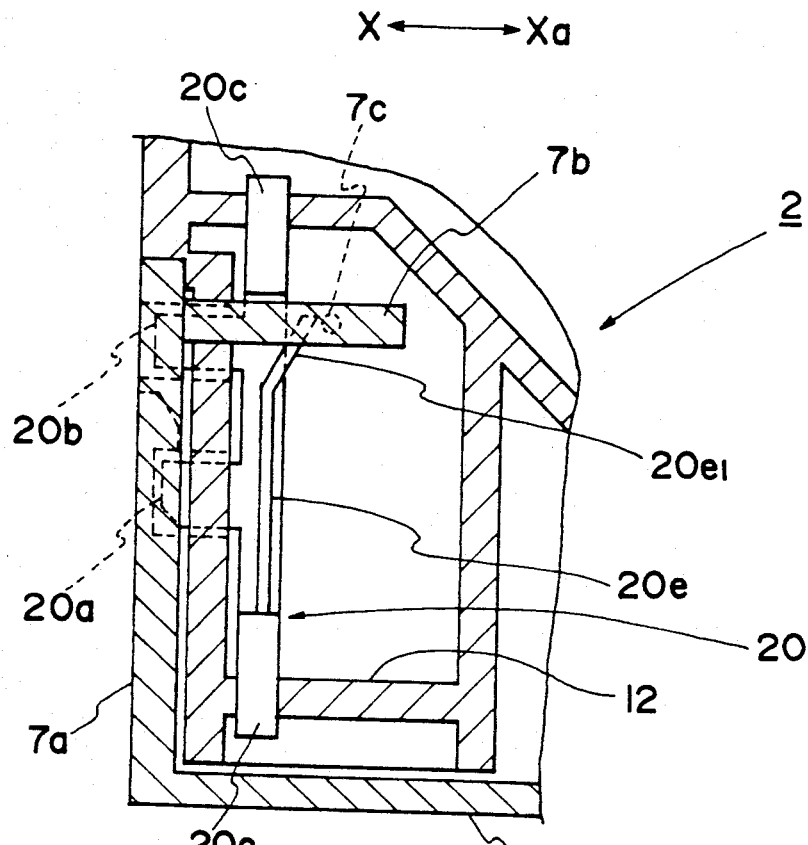
FIGS. 2A to 4B are sectional views of the front lid locking mechanism shown in FIG. 1 for illustrating the locking and unlocking operations of the locking mechanism.
Figure 2B:
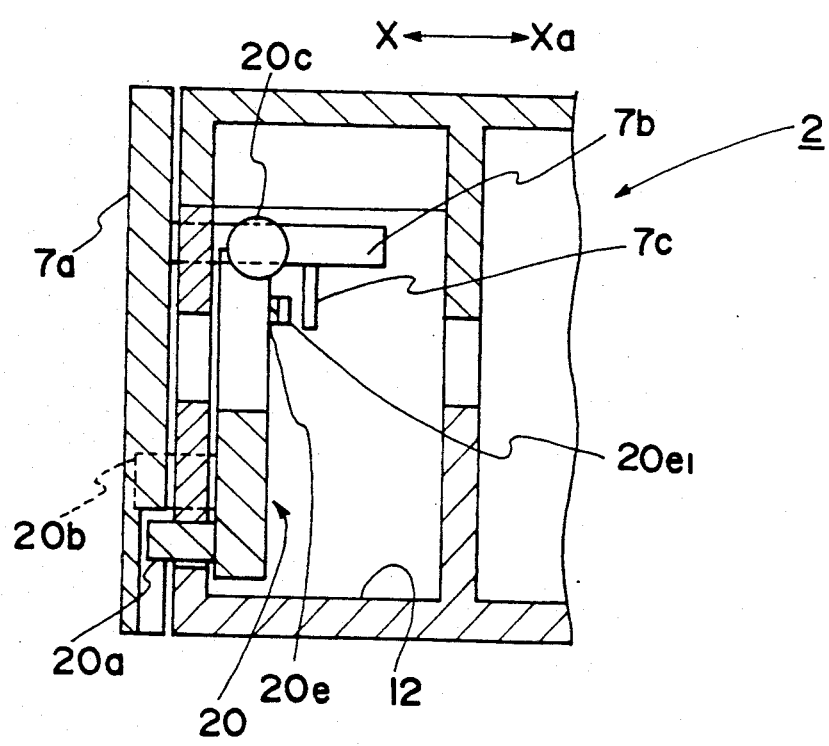

FIGS. 2A and 2B shows the condition before the tape cassette 1 is mounted in the video deck with the front lid 7 of the cassette 1 locked in the closed state and illustrate sectional views seen in the directions of A and B in FIG. 1, respectively.

The swinging movement 20 of the lock plate in the X-Xa direction in the lock plate mounting chamber 12 is limited by the engagement of the extension $20e_1$ of the position limiting member 20e of the lock plate 20 with the projection 7c suspended from the pin 7b of the front lid 7, so that the locking of the front lid 7 is never released. During this engagement, no force is applied to the extension $20e_1$ of the position limiting member 20e and the positional relationship between the extension $20e_1$ and the projection 7c is suitably maintained with a clearance of about 0.5 to 1.0 mm, for instance. This clearance is smaller than that between the projecting end of the locking claw 20a and one side end 7a of the front lid 7.

Figure 3A:
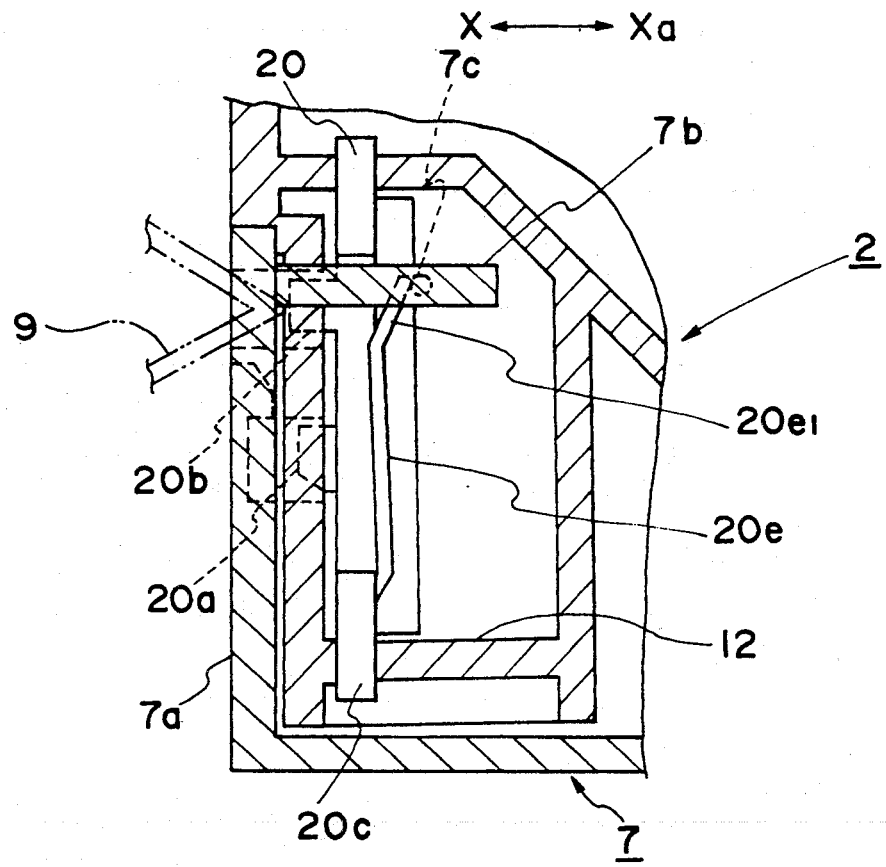
Figure 3B:
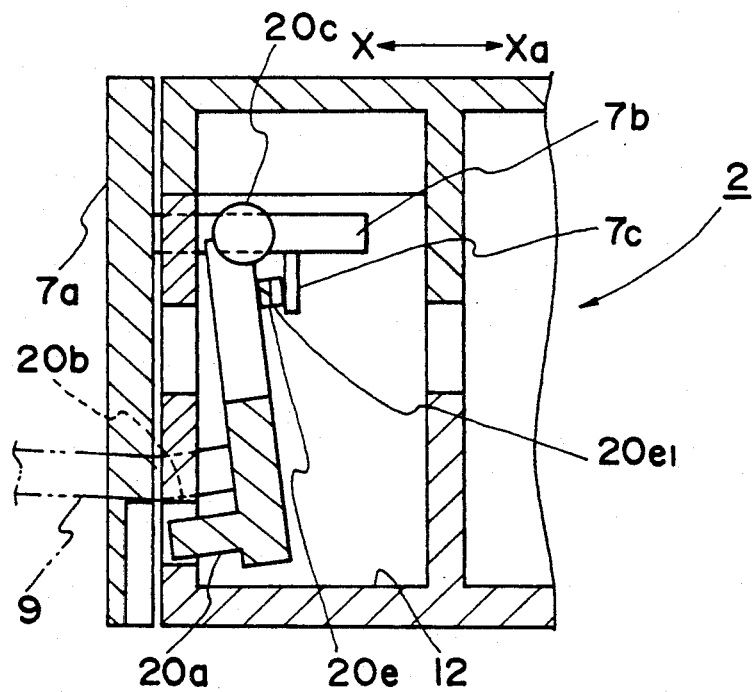

Referring to FIGS. 3A and 3B showing the state in which the tape cassette 1 is mounted in the video deck and illustrating sectional views seen in the directions of A and B in FIG. 1, respectively. The projection 20b projecting outwardly from the case body 2 is pressed inwardly by the member 9 secured to the side of the video deck thereby inwardly moving the lock plate 20 to the unlocking position against the urging force of the position limiting member 20e, whereby the locking of the front lid by the locking claw 20a can be released. During this releasing operation, the extension $20e_1$ of the position limiting member 20e abuts against the projection 7c suspended from the pin 7b of the front lid 7, and the member 20e is elastically deformed by the urging force applied by the member 9.

In the next step, a lever 10 as a member for opening the front lid disposed on the side of the video deck is guided into the vertical groove 11 formed at the front portion of the case body 2 to upwardly open the front lid 7 against the urging force of the coil spring 8.

Figure 4A:
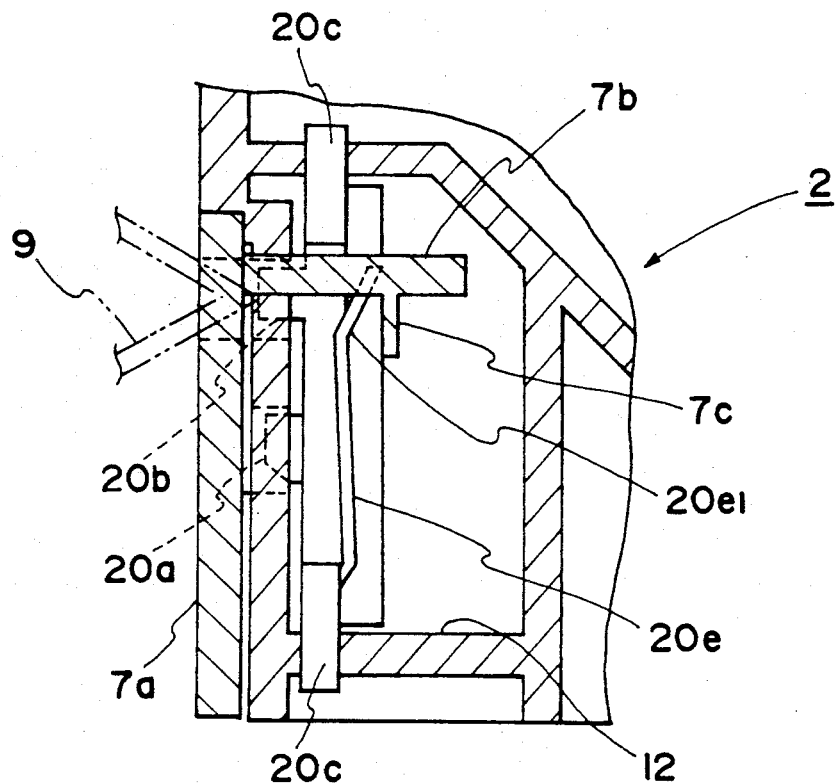
Figure 4B:
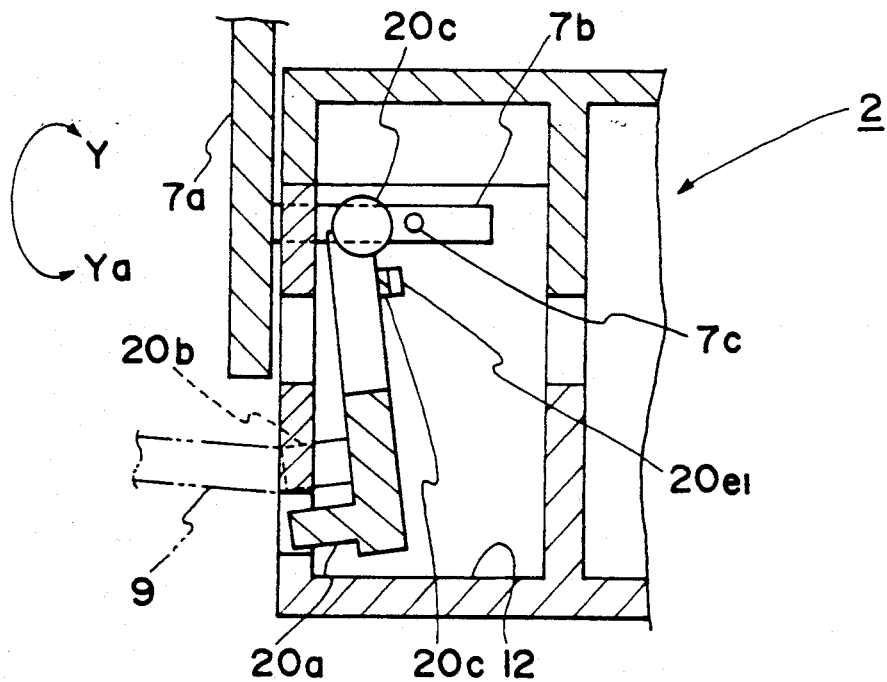
Figure 5:
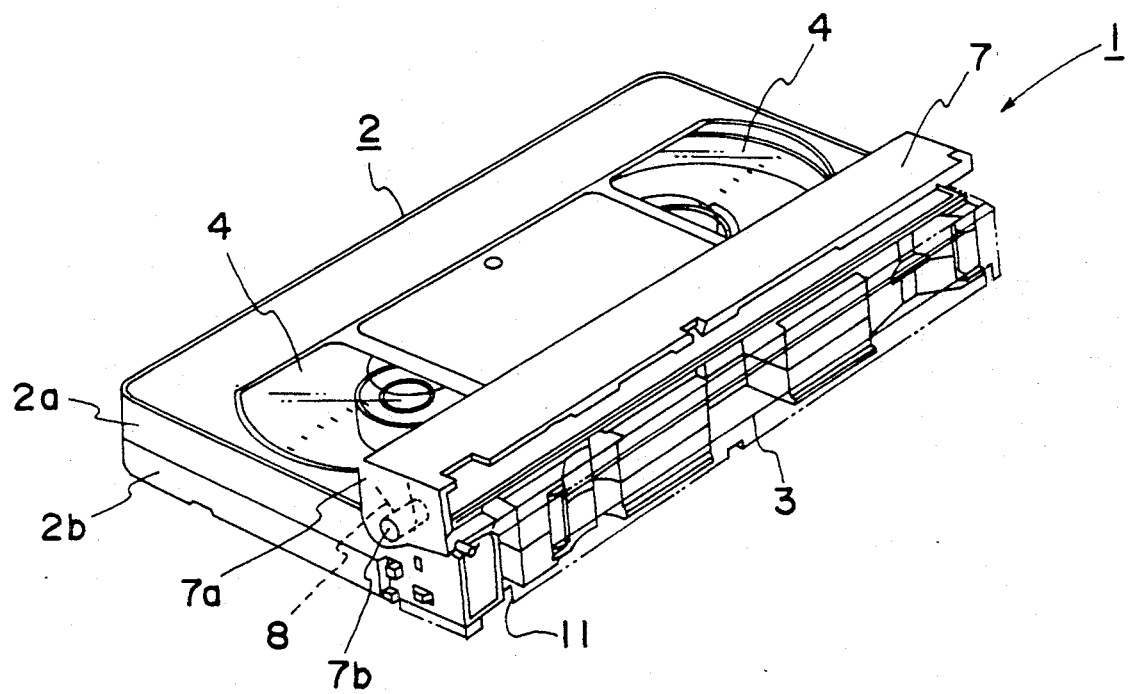
FIG. 5 shows a perspective view of a tape cassette in which the front lid locking mechanism, for example shown in FIG. 1, is mounted.
Figure 6:
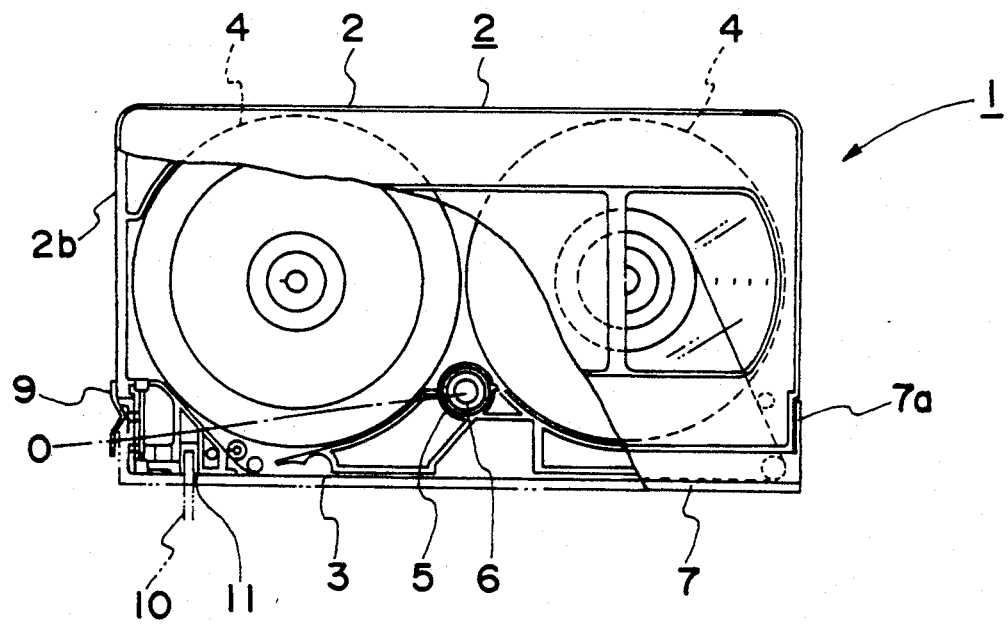
FIG. 6 is a plan view, partially broken away, of the tape cassette shown in FIG. 5.

Next, referring to FIGS. 4A and 4B, the pin 7b is rotated in the Y direction in accordance with this opening movement of the front lid 7 under the state that the projection 7c is swung from the suspended position to the horizontal position with respect to the pin 7b. According to this movement, the projection 7c is separated from the extension $20e_1$ of the position limiting member 20e and the member 20 becomes free from the urging force applied thereto and returns to the state which is similar to the state shown in FIG. 2 with no elastic deformation.

Accordingly, the position limiting member 20 of the lock plate 20 is urged by the pressing force of the member 9 only at a time when the projection 20b is pressed inwardly and the front lid 7 has been in the closed state.

After the above steps have been completed, the tape 3 is drawn out from the case body 2 of the opened tape cassette 1, and then the recording or replaying operation of the tape is carried out.

The processes for taking out the tape cassette 1 mounted in the video deck therefrom will be described hereunder.

After the recording or replaying operation, the tape 3 is first accommodated in the case body of the tape cassette 1. The lever 10 is retracted from the groove 11 formed at the front portion of the case body 2 thereby downwardly closing the front lid 7. With this operation, the pin 7b of the front lid 7 is rotated in the Ya direction, shown in FIG. 4B, and the projection 7c of the pin 7b returns to the suspended position from the horizontal position. Accordingly, the abutting condition between the side surface of the extension $20e_1$ of the position limiting member 20e and the projection 7b can be maintained in compliance with the closing movement of the front lid 7 regardless of the position of the lock plate 20 in the lock plate mounting chamber 12 as shown in FIG. 3A or 3B. During this process, as described before, the position limiting member 20e is urged by the force inwardly applied to the projection 20b by the member 9 and the member 20e is thus deformed.

When the tape cassette 1 is taken out from the video deck in the next step, the pressing force of the operating member 9 secured on the side of the video deck to the projection 20b is released so as to assume the state shown in FIG. 2A or 2B, and the lock plate 20 returns to a position swingable in the X-Xa direction in the lock plate mounting chamber 12. The swingable range of the lock plate 20 in the chamber 12 is limited as described hereinbefore, so that the front lid 7 has been locked.

According to the tape cassette of the present invention, as described, the elastically deformable position limiting member of the lock plate is urged by an operating member located on the side of a video deck only at a time when the projection for releasing the locking condition is inwardly pressed and the front lid is under the closed state. Accordingly, the deformation or loss of elastic property of the position limiting member as an elastic member due to the lapse of time can be held to the minimum. The front lid of the tape cassette can therefore be surely closed and the tape itself can be stably protected.

What is claimed is:

1. A tape cassette comprising a cassette body in which a pair of tape reels are mounted, a protective lid pivotally mounted on a front end of the body for movement between open and closed positions, and a locking mechanism for the lid for releasably locking the lid in the closed position, the locking mechanism including a lock plate pivotally mounted in a chamber at one side of the cassette body and having a locking claw with a locking position wherein the claw extends through an opening in one wall of the body defining said chamber to lock the lid, the lock plate being movable inwardly to retract the claw in said opening and release the lid, wherein the plate is provided with a position limiting member of elasticly deformable material and the lid is formed with a projection extending into said chamber to cooperate with said limiting member, said projection being moved between first and second positions when the lid is opened and closed respectively, said limiting member and said projection being relatively configured and disposed for (a) providing clearance therebetween when the lid is closed and the claw is in locking position (b) providing engagement therebetween when the plate is moved inwardly dot release the lid, and (c) providing disengagement between the limiting member and the projection when the lid is opened and the projection is moved from the second position to the first position.

2. A cassette as defined in claim 1 wherein said projection is formed on a pivot pin of the lid by which the lid is mounted on the cassette body.

* * * * *